United States Patent [19]

Simons

[11] E Patent Number: Re. 32,892

[45] Reissued Date of Patent: Mar. 21, 1989

[54] METHOD OF WELDING ALUMINUM DRIVESHAFT COMPONENTS

[75] Inventor: Samuel Simons, Marion, Ind.

[73] Assignee: Dana Corporation, Toledo, Ohio

[21] Appl. No.: 32,846

[22] Filed: Mar. 31, 1987

Related U.S. Patent Documents

Reissue of:

[64] Patent No.: 5,422,805
Issued: Sep. 17, 1985
Appl. No.: 545,125
Filed: Oct. 25, 1983

[51] Int. Cl.[4] ..... B23K 9/23

[52] U.S. Cl. ..... 219/137 WM; 219/137 R; 228/154; 228/165

[58] Field of Search ..... 219/137 WM, 137 R; 228/154, 165; 403/272

[56] References Cited

U.S. PATENT DOCUMENTS

| | | | |
|---|---|---|---|
| 1,291,388 | 1/1919 | Bright et al. | 403/266 |
| 2,291,420 | 7/1942 | Swenson | 228/165 |
| 2,787,699 | 4/1957 | Jessen | 219/137 R |
| 2,852,659 | 9/1958 | Belz et al. | 219/74 |
| 2,977,675 | 4/1961 | Simms | 219/137 R |
| 3,059,093 | 10/1962 | Norcross et al. | 219/74 |
| 3,078,818 | 2/1963 | Butler | 228/145 |
| 3,791,026 | 2/1974 | Dufrene et al. | 228/154 |

FOREIGN PATENT DOCUMENTS

| | | |
|---|---|---|
| 667974 | 3/1952 | United Kingdom . |
| 678549 | 9/1952 | United Kingdom . |
| 858908 | 1/1961 | United Kingdom . |
| 942622 | 11/1963 | United Kingdom . |
| 1130038 | 10/1968 | United Kingdom . |
| 1472002 | 4/1977 | United Kingdom . |

OTHER PUBLICATIONS

Lyman, Taylor, ed., *Metals Handbook*, 8th ed., vol. 6, Metals Park, Ohio: American Society for Metals, 1971, pp. 311–312.

"Procedure Handbook of Arc Welding", (pp. 353–358), Published 1942 by the Lincoln Electric Company.

*Primary Examiner*—Clifford C. Shaw

*Attorney, Agent, or Firm*—MacMillan, Sobanski & Todd

[57] ABSTRACT

A method of welding a pair of aluminum driveshaft components together is disclosed. A first driveshaft component is formed with a hollow cylindrical end portion having an inside diameter and a flat radially-extending end surface. A second driveshaft component is formed with a cylindrical end portion extending axially from a flat radially-extending shoulder. The end portion of the second driveshaft component has an outside diameter which is approximately equal to the inside diameter of the cylindrical end portion of the first component. The cylindrical end portion of the first component is telescopically positioned about a portion of the cylindrical end portion of the second component such that a predetermined distance defining a longitudinally-extending annular gap therebetween is maintained between the end surface of the first component and the shoulder of the second component. A welding compound is supplied within the gap to weld the first and second driveshaft components together. An envelope of shielding inert gas can be provided about the gap during the welding process.

9 Claims, 1 Drawing Sheet

METHOD OF WELDING ALUMINUM DRIVESHAFT COMPONENTS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates in general to welding processes for aluminum workpieces and in particular to a method of arc welding aluminum driveshaft components together utilizing inert gas shielding.

In the field of welding aluminum and aluminum alloys, the practice of inert gas shielded arc welding is common. Such welding typically includes the use of either a consumable or non-consumable welding electrode and is customarily either automatic or semi-automatic in operation. Although not limited thereto, the present invention has particular application in welding practices which utilize a consumable electrode, wherein a filler wire constituting a consumable electrode is fed automatically to a welding gun. Upon actuation of the gun trigger, the filler wire is fed to a welding arc within an envelope of shielding inert gas, such as argon, helium, or mixtures thereof. The gun is moved such that the point of the wire electrode follows the seam to be welded.

The use of aluminum and aluminum alloys in automobiles is becoming increasingly popular. Such popularity is mainly due to the fact that aluminum components can be manufactured much lighter in weight than the comparable steel components which they replace without sacrificing strength or durability. For example, aluminum driveshaft components typically weigh up to one-third less than conventional steel driveshaft components. Also, aluminum components are less subject to failure from corrosion and the like. However, it is difficult to securely join such aluminum driveshaft components utilizing conventional welding practices.

2. Description of the Prior Art

U.S. Pat. No. 1,291,388 to Bright et al. discloses an improved shaft joint and a method of forming such a joint. A shaft stub is formed with an annular beveled shoulder and several longitudinal grooves, the shoulder being disposed at the inner end of the grooves. A tubular shaft is sleeved upon the shaft stub and swaged into the grooves to provide internal groove-engaging keys. To further reinforce and secure the joint, the end of the tubular shaft is welded upon the beveled shoulder of the shaft stub.

U.S. Pat. No. 3,791,026 to Dufrene et al. discloses a method of joining a niobium tube to a stainless steel tube. The method consists of fitting the end portion of the niobium tube within the end portion of the steel tube while maintaining a predetermined radial and annular clearance therebetween. The steel tube is provided at its extremity with an external machined flange so as to form a reservoir. The reservoir is filled with a suitable brazing compound, placed in a vacuum, and heated to a high temperature. When the brazing compound has penetrated into the clearance, the treatment is stopped and the flange is removed, together with any excess brazing material.

U.S. Pat. No. 3,078,818 to Butler discloses a method of compensating for the effect of cambered strip stock in making a helical seam metal tube. The strip is advanced longitudinally and formed into a helix, wherein the edges are welded together progressively to form a helical seam. The rear marginal edge portion of the strip is provided with a sloping shoulder and a flat terminal marginal section therebeyond. As the strip is longitudinally advanced to the partially completed tube, the helix angle thereof is adjusted as required by the camber of the strip to cause the near edge of the strip to engage the sloping shoulder at a given meeting point.

U.S. Pat. No. 2,852,659 to Belz et al. and U.S. Pat. No. 3,059,093 to Norcross et al. both disclose welding processes and electrodes for aluminum or aluminum alloy materials wherein an inert gas is utilized to shield the region of the weld from the atmosphere. A related welding process disclosed in U.S. Pat. No. 2,291,420 to Swenson.

SUMMARY OF THE INVENTION

A method of welding a pair of aluminum driveshaft components together is disclosed. A first driveshaft component is formed with a hollow cylindrical end portion having an inside diameter and a flat radially-extending end surface. A second driveshaft component is formed with a cylindrical end portion extending axially from a flat radially-extending shoulder. The end portion of the second driveshaft component has an outside diameter which is approximately equal to the inside diameter of the cylindrical end portion of the first component. The cylindrical end portion of the first component is telescopically positioned about a portion of the cylindrical end portion of the second component such that a predetermined distance defining a longitudinally-extending annular gap therebetween is maintained between the end surface of the first component and the shoulder of the second component. A welding compound is supplied within the gap to weld the first and second driveshaft components together. An envelope of shielding inert gas can be provided about the gap during the welding process.

It is an object of the present invention to provide an improved method for welding aluminum driveshaft components together.

It is a further object of the present invention to provide a method of inert gas shielded arc welding of aluminum driveshaft components.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
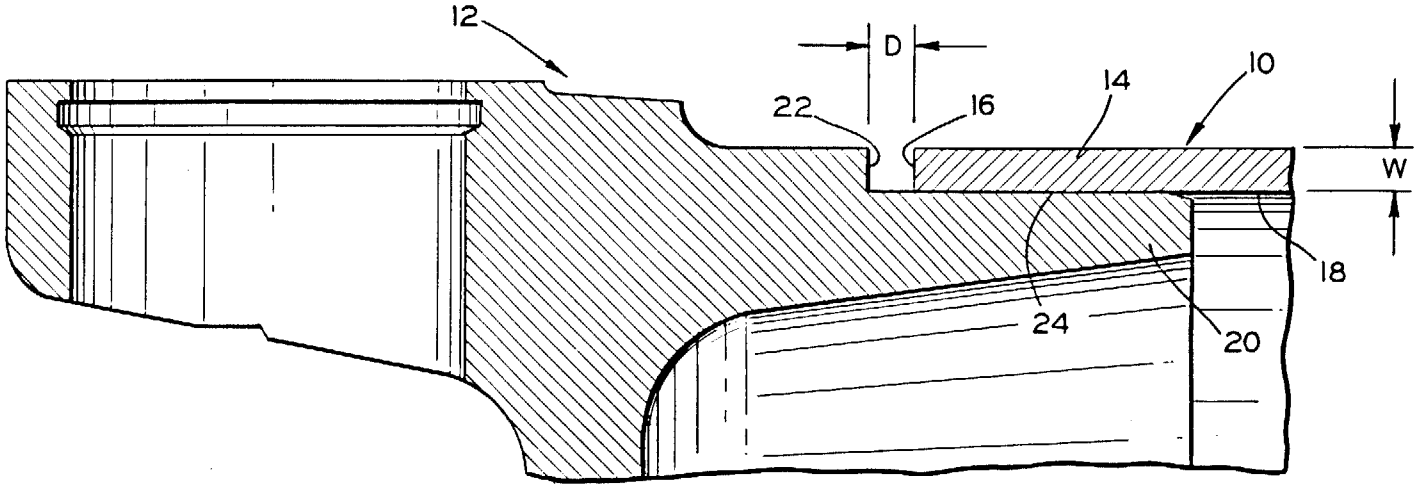
FIG. 1 is a sectional elevational view, partially broken away, of two aluminum driveshaft components oriented for welding in accordance with the method of the present invention.
Figure 2:
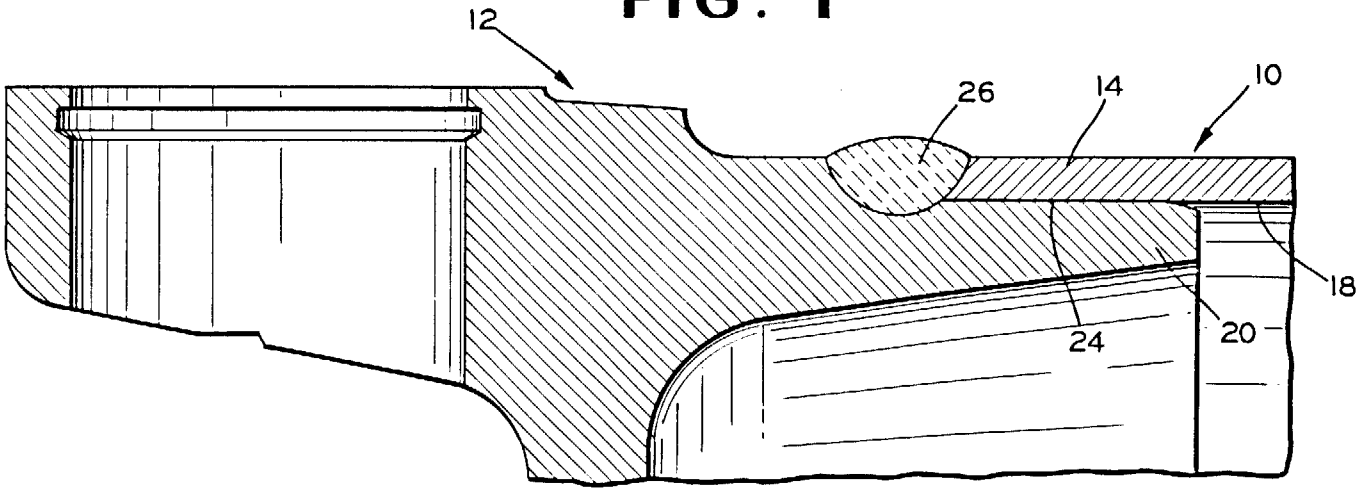
FIG. 2 is a sectional elevational view similar to FIG. 1 illustrating the two driveshaft components after the welding process has been completed.

Referring now to the drawings, there is illustrated in FIGS. 1 and 2 a pair of aluminum driveshaft components 10 and 12 longitudinally oriented to be welded together. The first component 10 is typically a tubular driveshaft and is formed with a hollow cylindrical end portion 14 which terminates in a flat radially-extending end surface 16. The end portion 14 has a predetermined wall thickness W and an inner surface 18 which defines an inside diameter.

The second component 12 is typically an aluminum yoke which is adapted for use in a conventional universal joint. The second component 12 includes a cylindrical end portion 20 which extends axially from a flat radially-extending shoulder 22. The cylindrical end portion 20 of the second component has an outer surface 24 which defines an outside diameter. The outside diameter of the end portion 20 of the second component 12 is approximately equal to the inside diameter of the end portion 14 of the first component 10 such that a press fit relationship is obtained when the end portion 14 of the first component 10 is positioned telescopically about the end portion 20 of the second component 12, as illustrated in the drawings.

Prior to beginning the welding process, the cylindrical end portion 14 of the first component 10 is positioned telescopically about the end portion 20 of the second component 12 such that a predetermined distance D is maintained between the end surface 16 of the first component 10 and the shoulder 22 of the second component 12. Thus, the distance D represents a predetermined length of the cylindrical end portion 20 of the second component 12 which is exposed to the exterior of the joint. Accordingly, a longitudinally-extending annular gap is defined between the first component 10 and the second component 12.

The maintenance of the gap between the first and second components 10 and 12 is necessary because of the thermal properties of aluminum and because less mass is involved in the aluminum components 10 as opposed to steel. When compared with steel, the material typically used in such driveshaft components, aluminum has a relatively high thermal conductivity and relatively low melting point. Thus, when the first and second components 10 and 12 are formed of steel, the distance D can be reduced to zero such that the end surface 16 of the first component 10 abuts the shoulder 22 of the second component 12. Because steel has a relatively low thermal conductivity and a relatively wide temperature range in which it is in a formable plastic state, the weld will penetrate sufficiently deep in the steel components to form a secure weld without providing a gap between the components.

When the first and second components 10 and 12 are formed of aluminum, however, it has been found that the weld will not penetrate deeper than approximately one-sixteenth of an inch unless the gap is provided. If it is attempted to penetrate deeper into the aluminum components 10 and 12 without providing the gap, the high temperatures generated during the welding process will completely melt and destroy the outer regions of the component 10. Consequently, when the wall thickness W of the first component 10 is greater than one-sixteenth of an inch, it is necessary to provide the above-described gap between the first and second components 10 and 12 in order to create a secure weld therebetween.

It has been found that a gap having a distance D of one-eighth of an inch will provide a satisfactory weld for wall thicknesses W of the first component 10 ranging from about one-sixteenth of an inch to about one-quarter of an inch. Typically, the wall thickness W of the tubular aluminum driveshaft component 10 is about one-eighth of an inch. In such instances, the distance D can be made equal to the wall thickness W. When the wall thickness W of the first component 10 exceeds one-quarter of an inch, the distance D preferably is increased slightly.

Once the desired gap has been achieved, a gaseous atmosphere can be supplied about the region of the gap by any conventional means (not shown) in order to shield the area to be welded from the atmosphere. The gaseous atmosphere can be any inert gas, such as argon, helium, or mixtures thereof. After the gaseous shield has been so supplied, the gap can be filled with a welding compound 26 from a conventional arc welder (not shown). The welding compound 26 is typically applied by rotating the first and second components 10 and 12, respectively, with respect to the arc welder such that the welding compound 26 is injected into the gap therebetween. The welding compound 26 fuses the region of the end surface 16, the exposed portion of the outer surface 24, and the shoulder 22 such that a secure weld is formed. It has been found desirable to complete the weld through two full revolutions of the first and second components 10 and 12, respectively, such that one-half of the gap is filled with the welding compound 26 during each revolution. This is done in order to reduce the magnitude of the welding current, which can cause deleterious effects during the welding process resulting from magnetization of the welding apparatus.

In accordance with the provisions of the patent statutes, the principle and mode of operation of the present invention have been explained and illustrated in its preferred embodiment. However, it must be appreciated that the present invention can be practiced other than as specifically explained and illustrated without departing from its spirit or scope.

What is claimed is:

1. A method of welding first and second aluminum drive shaft components together comprising the steps of:

(a) [firming] *forming* the first component with a hollow cylindrical end portion having an inside diameter and terminating in a flat radially-extending end surface;

(b) forming the second component with a cylindrical end portion extending axially from a flat radially-extending shoulder and having a constant outside diameter which is approximately equal to the inside diameter of the cylindrical end portion of the first component;

(c) positioning the cylindrical end portion of the first component telescopically about a portion of the cylindrical end portion of the second component such that a predetermined distance is maintained between the end surface of the first component and the shoulder of the second component defining a longitudinally-extending annular gap therebetween; and (d) filling the gap with a welding compound to weld the first and second components together.

2. A method in accordance with claim 1 wherein step (c) further includes the step of positioning the cylindrical end portion of the first component in a press fit relationship telescopically about a portion of the cylindrical end portion of the second component.

3. A method in accordance with claim 1 wherein step (e) further includes the steps of rotating the components through two complete revolutions with respect to an arc welder and filling the gap halfway with the welding compound on each revolution.

4. A method of welding first and second aluminum drive shaft components together comprising the steps of:

(a) forming the first component with a hollow cylindrical end portion having an inside diameter, a predetermined wall thickness, and terminating in a flat radially-extending end surface;

(b) forming the second component with a cylindrical end portion extending axially from a flat radially-extending shoulder and having a constant outside diameter which is approximately equal to the inside diameter of the cylindrical end portion of the first component;

(c) positioning the cylindrical end portion of the first component telescopically about a portion of the cylindrical end portion of the second component such that a predetermined distance is maintained between the end surface of the first component and the shoulder of the second component defining a longitudinally-extending annular gap;

(d) supplying a shield of inert gas about the gap; and (e) filling the gap with a welding compound to weld the first and second components together.

5. A method in accordance with claim 4 wherein step (c) further includes the step of positioning the cylindrical end portion of the first component in a press fit relationship telescopically about a portion of the cylindrical end portion of the second component.

6. A method in accordance with claim 4 wherein step (e) further includes the steps of rotating the components through two complete revolutions with respect to an arc welder and filling the gap halfway with the welding compound on each revolution.

7. A method in accordance with claim 4 wherein step (a) further includes the step of forming the hollow cylindrical end portion of the first component with a wall thickness of [one-eighth] *greater than one-sixteenth* of an inch.

8. A method in accordance with claim [7] *9* wherein step (c) further includes the step of positioning the cylindrical end portion of the first component such that the predetermined distance is [within the range of one-sixteenth of an inch to one-quarter] *one-eighth* of an inch.

*9. A method in accordance with claim 7 wherein step (a) further includes the step of forming the hollow cylindrical end portion of the first component with a wall thickness within the range of from one-sixteenth of an inch to one-quarter of an inch.*

* * * * *

UNITED STATES PATENT AND TRADEMARK OFFICE

CERTIFICATE OF CORRECTION

PATENT NO. : Re. 32,892

DATED : March 21, 1989

INVENTOR(S) : Samuel Simons

It is certified that error appears in the above-identified patent and that said Letters Patent is hereby corrected as shown below:

Page 1, under subtitle "Related U.S. Patent Documents, Item [64]":

"Patent No. 5,422,805" should read -- Patent No. 4,542,280 --.

Signed and Sealed this

Seventeenth Day of October, 1989

*Attest:*

DONALD J. QUIGG

*Attesting Officer*

*Commissioner of Patents and Trademarks*